3,507,805
LONG-AFTERGLOW PHOSPHOR
Willi Lehmann, Murrysville, Pa., assignor to Westinghouse Electric Corporation, Pittsburgh, Pa., a corporation of Pennsylvania
Filed Apr. 18, 1967, Ser. No. 631,669
Int. Cl. C09k 1/12
U.S. Cl. 252—301.6                    5 Claims

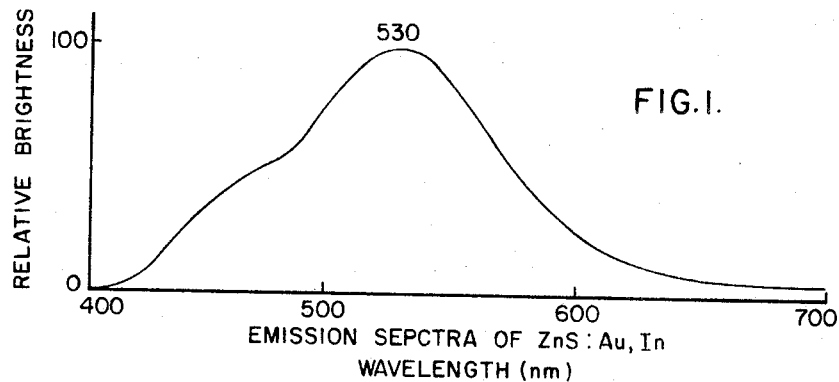
FIG. 1. EMISSION SPECTRA OF ZnS:Au,In
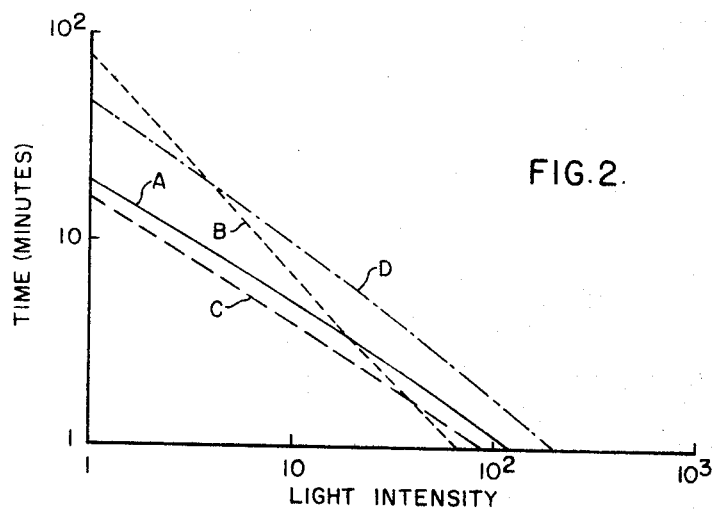
FIG. 2.
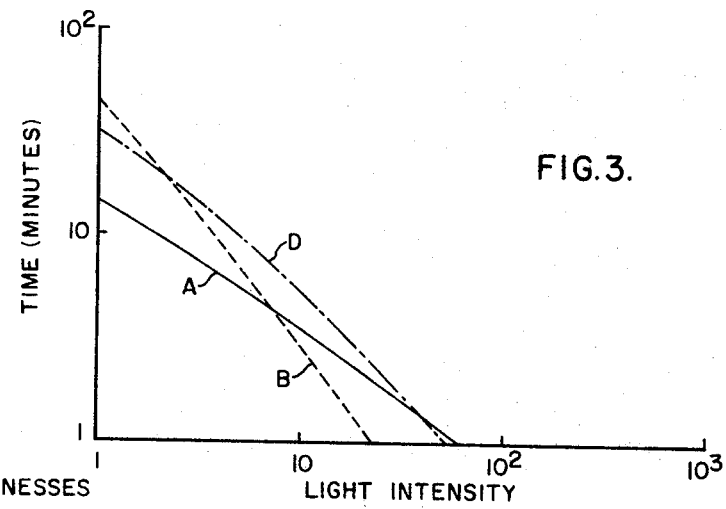
FIG. 3.
INVENTOR
Willi Lehmann United States Patent Office 3,507,805
Patented Apr. 21, 1970

ABSTRACT OF THE DISCLOSURE

Zinc-sulfide phosphor is activated by gold and indium, and exhibits a superior phosphorescent afterglow after excitation by either daylight or ultraviolet.

BACKGROUND OF THE INVENTION

This invention relates to phosphors, and particularly to zinc-sulfide activated by gold and indium.

Phosphors that exhibit a bright and long-lasting phosphorescence after excitation ceases are used in a wide variety of applications, such as for luminous coating of dials and instruments as well as for radar screens. These diverse uses make desirable a phosphor that can be excited by a wide range of wavelengths and is usable under different operating conditions. A stable phosphor that emits in the visible spectrum where the human eye is very sensitive is especially desirable.

Zinc-sulfide activated by gold, gallium and a halogen coactivator is taught by Rothschild, British Patent 998,587 dated July 14, 1965. The phosphor produced therein has a contrasting short decay time for phosphorescence with emission peaking in the red region of the visible spectrum, and requiring a total gallium and halogen activator to gold ratio greater than unity.

SUMMARY

It is an object of this invention to produce a novel phosphor exhibiting a long-afterglow of phosphorescence.

It is another object to provide a long-afterglow phosphor which is chemically stable in air at room temperature as well as being non-toxic and inexpensive to produce.

It is a further object to provide a long-afterglow phosphor having an emission in the region of the visible spectrum where the human eye is very sensitive.

It is a still further object to provide a method for preparing a long-afterglow phosphor which emits in the region of the visible spectrum where the human eye is very sensitive.

These objects and others that will become apparent have been achieved by providing a zinc-sulfide, gold and indium activated phosphor that exhibits a superior afterglow after having been excited by daylight conditions or ultraviolet. This afterglow emission is concentrated at the greenish region of the visible spectrum where the human eye is very sensitive.

BRIEF DESCRIPTION OF THE DRAWINGS

FIGURE 1 is a graph of the emission spectrum of the present phosphor when excited by daylight or 365 nm. ultraviolet energy.

FIG. 2 is a graph comparing the phosphorescent intensity versus time after ultraviolet excitation ceases for several commonly used long-afterglow phosphors and the phosphor of the present invention; and FIG. 3 is a graph comparing the phosphorescent intensity versus time after diffuse daylight excitation ceases for several commonly used long-afterglow phosphors and the phosphor of the present invention.

DESCRIPTION OF THE PREFERRED EMBODIMENTS

Example 1

An aqueous solution of gold chloride containing $5 \times 10^{-5}$ gram-atom of gold is added to one mole of finely divided ZnS to form a slurry. The slurry is dried and fired in an iodine atmosphere at from 1100–1300° C. for one hour. After allowing the phosphor to cool and mechanically reducing it to finely divided status, an aqueous solution of indium nitrate containing $2 \times 10^{-5}$ gram-atom of indium is added. The resulting slurry is dried and refired in a flowing $H_2S$ atmosphere at from 1100–1300° C. for one hour. The final firing in $H_2S$ causes the indium substantially to replace the halogen in the phosphor which was introduced during the initial firing step.

Example 2

An aqueous solution of gold chloride containing $5 \times 10^{-5}$ gram-atom of gold and indium nitrate in the amount of $2 \times 10^{-5}$ gram-atom of indium is added to one mole of finely divided ZnS. The resulting slurry is dried and fired in an iodine atmosphere at from 1100–1300° C. for one hour; and after cooling and milling to finely divided status the phosphor is refired in an $H_2S$ atmosphere at from 1100–1300° C. for one hour. The final firing in $H_2S$ substantially volatizes any residual iodine.

In Examples 1–2 the firing times can be as short as fifteen minutes, while no improvement in performance is noted for firing beyond one hour.

Example 3

An aqueous solution of gold chloride containing $5 \times 10^{-5}$ gram-atom of gold and a solution containing 0.134 mole of KCl is added to one mole of ZnS. This amount of KCl is about ten percent by weight of the zinc-sulfide used. The resulting slurry is dried and fired in an inert atmosphere, such as argon or nitrogen, at 1100–1300° C. for at least fifteen minutes and preferably for about one hour. The phosphor is mechanically reduced to finely divided status and washed in distilled water. An indium nitrate solution containing $2 \times 10^{-5}$ gram-atom of indium is added to the phosphor. The slurry is dried and fired in an $H_2S$ atmosphere at 1100–1300° C. for at least fifteen minutes and preferably for about one hour. The final firing in $H_2S$ substantially volatizes any residual chlorine.

The phosphor as prepared in the examples emits in the greenish portion of the visible spectrum at about 530 nm. when excited by ultraviolet of 365 nm. wavelength, or by daylight as is shown in FIG. 1.

In the aforementioned specific examples, while gold chloride and indium nitrate are preferred as the preselected compounds containing gold and indium as the metallic constituents, other compounds such as gold cyanide, gold nitrate, indium sulfate, or indium cyanide can be utilized to supply the gold and indium respectively, keeping the gram-atom ratios of gold and indium the same as expressed in the examples.

Also in these examples, while the ratio of gold to zinc-sulfide is preferred at $5 \times 10^{-5}$ gram-atom of gold per gram-mole of zinc-sulfide, the ratio can be varied from $1 \times 10^{-5}$ to $5 \times 10^{-4}$ gram-atom of gold per gram-mole of zinc-sulfide. While the ratio of total indium to zinc-sulfide is preferred at $2 \times 10^{-5}$ gram-atom of indium per gram-mole of zinc-sulfide, this ratio can be varied from $2 \times 10^{-6}$ to $5 \times 10^{-5}$ gram-atom of indium per gram-mole of zinc-sulfide. The gram-atom ratio of indium to gold is maintained at a value less than unity. The duration of the phosphorescent afterglow is shortened as the ratio of indium to gold closely approaches unity. While the preferred embodiment utilizes only zinc-sulfide, up to 10 mole percent of the zinc-sulfide can be replaced by cadmium sulfide, although the duration of the afterglow is shortened as the mole percent of cadmium sulfide is increased.

In Examples 1 and 2, the initial iodine firing atmosphere stimulates particle growth of the phosphor. Similarly in Example 3 the chlorine introduced by the potassium chloride serves the same purpose.

In the specific examples the reactive constituents iodine and chlorine are supplied by firing in an iodine atmosphere or by adding potassium chloride and firing in an inert atmosphere. Other reactive atmospheres can be utilized such as mixtures of iodine and argon or nitrogen.

While the specific examples call for mixing aqueous solutions containing gold and indium with the zinc-sulfide, the phosphor can be prepared by thoroughly mixing the same compounds in finely divided status with the zinc-sulfide.

In FIGS. 2 and 3 the phosphorescent intensity of afterglow is plotted versus time after excitation ceases. The performance of the phosphor of the present invention is shown by curve D and is compared against the best known prior art materials. In FIG. 2 the exciting source is 365 nm. ultraviolet energy and curve A represents the performance of an oxidized ZnS:Cu phosphor especially tailored to exhibit a long-afterglow. Also in FIG. 2 curve B represents the performance of a similar ZnS:Cu, Cl, Co phosphor, while curve C represents a ZnS:Au, Ga phosphor. These phosphors represent the best available long-afterglow phosphors. The exciting energy source used in FIG. 3 is diffused daylight and the designated curves represent the same phosphors as indicated in FIG. 2.

It will be recognized that a novel phosphor exhibiting a superior phosphorescent afterglow has been provided. The phosphor is excitable by both ultraviolet and by diffuse daylight and emits in the greenish portion of the visible spectrum where the human eye is very sensitive. A method for preparing a superior zinc-sulfide, gold, and indium long-afterglow phosphor has also been provided.

I claim as my invention:

1. A phosphor having a long phosphorescent afterglow and consisting essentially of a zinc-sulfide matrix activated by gold and indium, the gram-atom ratio of gold per gram-mole of zinc-sulfide is from $1 \times 10^{-5}$ to $5 \times 10^{-4}$, the gram-atom ratio of indium per gram-mole of zinc-sulfide is from $2 \times 10^{-6}$ to $5 \times 10^{-5}$, and the gram-atom ratio of indium to gold is a value less than unity.

2. The phosphor as specified in claim 1, wherein the ratio of gram-atoms of gold to gram-moles of zinc-sulfide is about $5 \times 10^{-5}$, and the ratio of gram-atoms of indium to gram-moles of zinc-sulfide is about $2 \times 10^{-5}$.

3. The phosphor as specified in claim 1, wherein up to ten mole percent of the zinc-sulfide is replaced by cadmium sulfide.

4. The method of preparing a zinc-sulfide phosphor activated by gold and indium to provide a phosphor having a long phosphorescent afterglow, which method comprises the steps of:
(a) thoroughly mixing finely divided zinc-sulfide with a preselected compound containing as its metallic constituent, gold in an amount of from $1 \times 10^{-5}$ to $5 \times 10^{-4}$ gram-atom per gram-mole of said zinc-sulfide;
(b) initially firing said mixture in an atmosphere consisting essentially of iodine or chlorine as the reactive constituent;
(c) reducing the resulting phosphor to finely divided status, and thoroughly mixing the phosphor with a compound containing as its metallic constituent indium in an amount of from $2 \times 10^{-6}$ to $5 \times 10^{-5}$ gram-atom per gram-mole of zinc-sulfide, with the gram-atom ratio of indium to gold in said mixture being less than unity; and
(d) refiring said resulting mixture in a hydrogen sulfide atmosphere for at least fifteen minutes and preferably for one hour at from 1100–1300° C.

5. The method specified in claim 4, wherein said chlorine is supplied to said initial firing atmosphere by adding potassium chloride to said mixture in an amount of about ten percent by weight of said zinc-sulfide and firing said mixture in an inert atmosphere.

References Cited

UNITED STATES PATENTS 3,210,290  10/1965  Wachtel _____ 252—301.65

FOREIGN PATENTS 782,095  9/1957  Great Britain.
998,587  7/1965  Great Britain.

HELEN M. McCARTHY, Primary Examiner

R. D. EDMONDS, Assistant Examiner